US008982360B2

(12) United States Patent
Zhao et al.

(10) Patent No.: US 8,982,360 B2
(45) Date of Patent: Mar. 17, 2015

(54) APPARATUS AND METHOD OF USING A LIGHT CONDUIT IN A POSITION DETECTOR

(71) Applicant: Honeywell International Inc., Morristown, NJ (US)

(72) Inventors: Tianfeng Zhao, Guangdong (CN); Zhongya Jiang, Guangdong (CN); Paul M. Popowski, Lake Mills, WI (US); Guenter Watzlawik, Albstadt (DE)

(73) Assignee: Honeywell International Inc., Morristown, NJ (US)

( * ) Notice: Subject to any disclaimer, the term of this patent is extended or adjusted under 35 U.S.C. 154(b) by 95 days.

(21) Appl. No.: 13/778,927

(22) Filed: Feb. 27, 2013

(65) Prior Publication Data

US 2014/0240717 A1 Aug. 28, 2014

(51) Int. Cl.
*G08B 13/186* (2006.01)
*G01B 11/14* (2006.01)
*G01J 1/18* (2006.01)
*G08B 13/08* (2006.01)

(52) U.S. Cl.
CPC . *G01J 1/18* (2013.01); *G08B 13/08* (2013.01); *G08B 13/186* (2013.01)
USPC .......................................................... 356/614

(58) Field of Classification Search
CPC ........................ G08B 13/1481; G08B 13/186
USPC .......................................................... 356/614
See application file for complete search history.

(56) References Cited

U.S. PATENT DOCUMENTS

| | | | | |
|---|---|---|---|---|
| 3,735,353 A | * | 5/1973 | Donovan et al. | 340/6.11 |
| 3,854,792 A | * | 12/1974 | Koelle | 385/115 |
| 4,262,284 A | * | 4/1981 | Stieff et al. | 340/541 |
| 4,447,123 A | * | 5/1984 | Page et al. | 385/115 |
| 4,507,654 A | | 3/1985 | Stolarczyk et al. | |
| 4,829,174 A | * | 5/1989 | Booth et al. | 250/221 |
| 5,189,396 A | * | 2/1993 | Stobbe | 340/541 |
| 5,912,619 A | | 6/1999 | Vogt | |
| 5,936,523 A | * | 8/1999 | West | 340/545.6 |
| 6,175,675 B1 | * | 1/2001 | Lee et al. | 385/50 |

(Continued)

FOREIGN PATENT DOCUMENTS

| | | | | |
|---|---|---|---|---|
| EP | 2 019 377 A1 | 1/2009 | | |
| GB | 2013 332 A | 8/1979 | | |
| GB | 2013332 A | * 8/1979 | | G01B 11/14 |

OTHER PUBLICATIONS

European Search Report from corresponding EP application 14154570.7, date of search completion Jun. 4, 2014.

*Primary Examiner* — Roy M Punnoose
(74) *Attorney, Agent, or Firm* — Husch Blackwell LLP

(57) ABSTRACT

A position detector includes a source of radiant energy, such as infrared light. A sensor is spaced from the source. The source and the sensor can be carried spaced apart from one another by a housing. Control circuits, carried by the housing, are coupled to the source and the sensor. Pulsed radiant energy, emitted by the source is incident on the sensor only when transmitted by a solid optical medium which has a predetermined orientation relative to the housing. When the medium has the predetermined orientation, the sensor receives transmitted radiant energy from the source. When the medium moves from the predetermined orientation, the sensor ceases to receive the transmitted radiant energy from the source, and the control circuits can generate an alarm indication.

15 Claims, 4 Drawing Sheets

(56) References Cited

U.S. PATENT DOCUMENTS

| | | | |
|---|---|---|---|
| 6,420,971 B1 * | 7/2002 | Leck et al. | 340/542 |
| 6,654,523 B1 * | 11/2003 | Cole | 385/52 |
| 6,707,979 B2 * | 3/2004 | Wang et al. | 385/140 |
| 7,471,203 B2 * | 12/2008 | Worthy et al. | 340/572.1 |
| 7,714,718 B2 | 5/2010 | DiPoala et al. | |
| 7,834,309 B2 | 11/2010 | Anderson et al. | |
| 7,986,232 B2 | 7/2011 | Sharma | |
| 8,334,773 B2 * | 12/2012 | Cova et al. | 340/572.1 |
| 8,432,274 B2 * | 4/2013 | Cova et al. | 340/539.13 |
| 8,456,302 B2 * | 6/2013 | Stevens | 340/539.31 |
| 8,511,911 B2 * | 8/2013 | Ott et al. | 385/78 |
| 2003/0123838 A1 * | 7/2003 | Wang et al. | 385/140 |
| 2004/0233054 A1 * | 11/2004 | Neff et al. | 340/539.1 |
| 2006/0257092 A1 * | 11/2006 | Lu et al. | 385/134 |
| 2007/0146131 A1 | 6/2007 | Boverie | |

* cited by examiner

APPARATUS AND METHOD OF USING A LIGHT CONDUIT IN A POSITION DETECTOR

FIELD

The application pertains to position detectors, such as door or window intrusion sensors. More particularly, the application pertains to such detectors which incorporate a fiber optic element, or other type of light pipe, to return light transmitted from a detector mounted on a movable door or window through a portion of an adjacent non-movable frame to the detector for analysis.

BACKGROUND

There are two kinds of technology that are widely used in implementing door/window intrusion sensors. One includes a combination of a reed switch with a magnet (mechanical contacts). The other includes a source, an infrared (IR) sensor and a reflector. Unfortunately, each of these methods could be defeated by a person having limited knowledge of the sensors.

Mechanical contacts can be easily defeated from the outside by using an additional magnet to keep the reed switch actuated while the window or door is being opened.

Known intrusion sensors based on IR transmission have constantly transmitted the IR. Such devices may be defeated by shining a light, such as flashlight, at the IR sensor, or using a thin mirror as a reflector to defeat the device.

DETAILED DESCRIPTION

Figure 1:
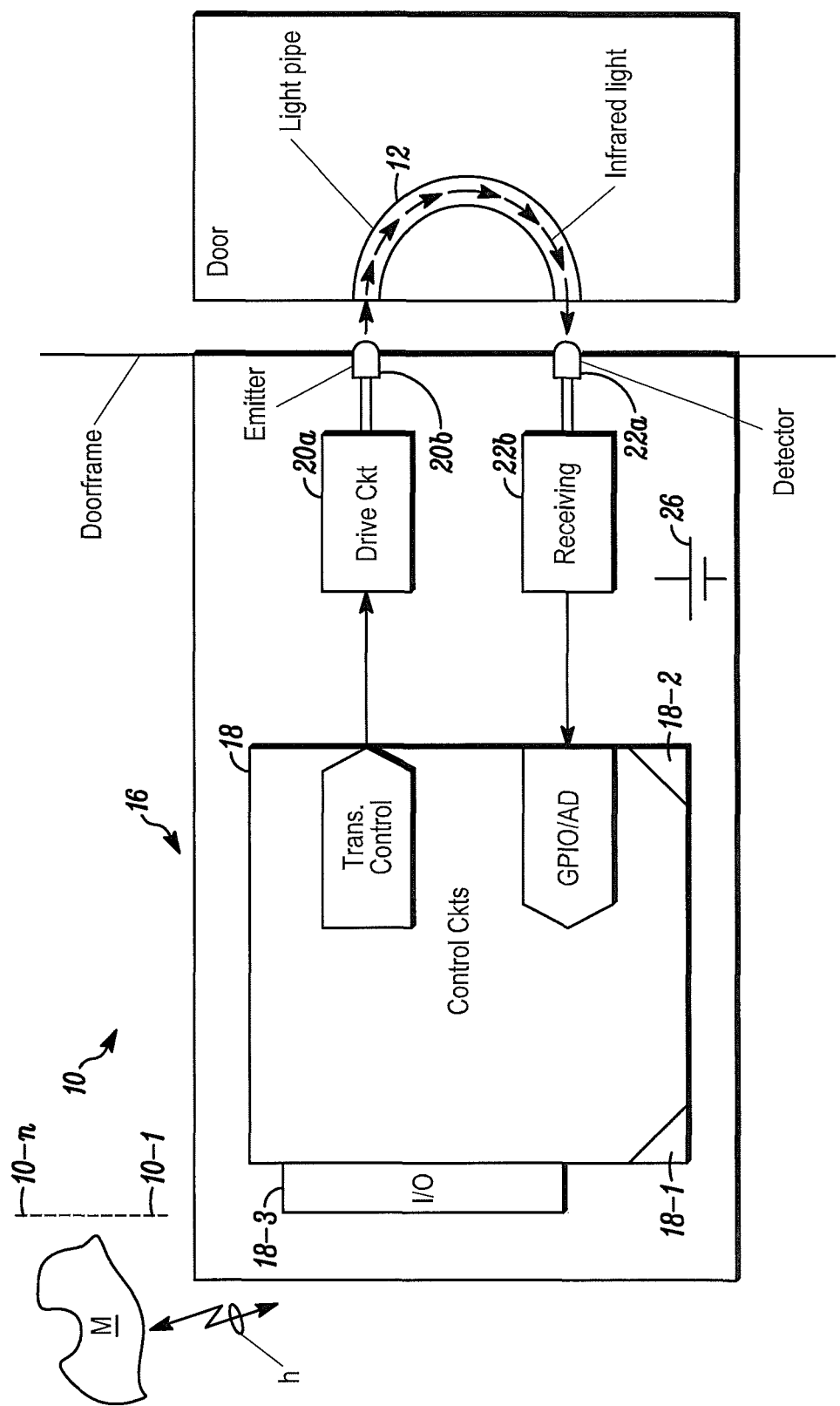
FIG. 1 illustrates a block diagram of a detector in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect, embodiments hereof include a door, or window detector, mountable on one of a frame, or a door or a window, transmits a coded beam of radiant energy, for example, infrared light toward a second element, such as a door or window or a frame. A fiber optic member can be installed in the second element, such as the adjacent door or window, or frame.

The beam of radiant energy can be transmitted from a source, via the fiber optic member, back to a sensor. The detector and the fiber optic member are in alignment only when the door, or window, is in a predetermined position relative to the adjacent member, such as the respective frame.

For example, if the position to be monitored corresponds to a closed door or window, the detector will receive the returned, coded, beam of radiant energy transmitted via the fiber optic member only when the door or window is closed.

If the door or window is moved relative to the frame, the transmission through the fiber optic member will be disrupted and the detector will immediately be able to detect the movement and transmit an alarm indictor to an associated security monitoring system.

In another aspect, the fiber optic member can have either a constant radius, or be tapered and have a variable, increasing or decreasing, radius from input end to output end. A security code can be used to pulse modulate the transmitted light. Alternately, the transmitted light can be modulated by phase shifting, frequency modulation, pulse duration modulation, or the like to increase the security of the transmitted signal. An attacker would have great difficulty, and probably not be able to replicate the transmitted, modulated sequence.

With respect to the figures, FIG. 1 illustrates a detector 10 which solves the problems mentioned above. Embodiments hereof advantageously use a light transmitting conduit, such as member 12, to securely transmit a beam of radiant energy, for example infrared light. The arrows in conduit 12 in FIG. 1 represent the direction of transmission of radiant energy as further discussed below.

Detector 10 includes a housing 16 which can be attached to a door frame, a window frame, a door or a window without limitation. Housing 16 carries control circuits 18 which could be implemented, at least in part by a programmable processor 18-1 and executable instructions, software, 18-2. The control circuits 18 include an input/output interface 18-3 which can be in wired or wireless communication via a medium W displaced monitoring system M. A plurality of detectors, 10-1 . . . 10-n, corresponding to detector 10 can be in communication with system M.

As discussed above, control circuits 18 can activate drive circuits 20a, via a modulated signal, for example a pulse sequence, to energize emitter, source 20b. Emitter 20b in turn outputs a modulated beam of radiant energy, such as infrared, which is coupled to conduit or light pipe 12 when the housing 16 exhibits a predetermined relationship with the conduit or light pipe 12. For example, when the door is closed against the frame or the window is closed against the frame.

In the above condition, the light beam travels through the conduit 12 and is then coupled to detector 22a, processed by receiving circuits 22b, and then made available to control circuits 18. If the transmission path of the beam is disrupted, by opening the door or window; for example, the control circuits can respond to the loss of radiant energy by forwarding an alarm indicator to the system M.

Those of skill will understand that neither the curvature nor the length of the conduit, or light pipe 12, are limitations hereof. Additionally, it will be understood that a variety of processes to modulate the radiant energy beam output by source, or emitter, 20b come within the spirit and scope hereof In summary embodiments as in FIG. 1 provide a new and low cost solution to door/window position sensing using a radiant energy conductor 12, such as a light pipe or fiber optic member for transmission. The fiber optic member 12 provides a high efficiency transmission medium which promotes detection of received radiant energy.

Further, by using the control circuits 18 to generate and transmit an encrypted data packet such as by randomly varying the pattern of light or by using various types of frequency modulation, the detector 10 can be expected to be more reliable and more difficult to be defeated. Since embodiments hereof exhibit both low cost and low power consumption, they can be powered by a batter 26 and are suitable for wireless door/window applications.

Figure 2:
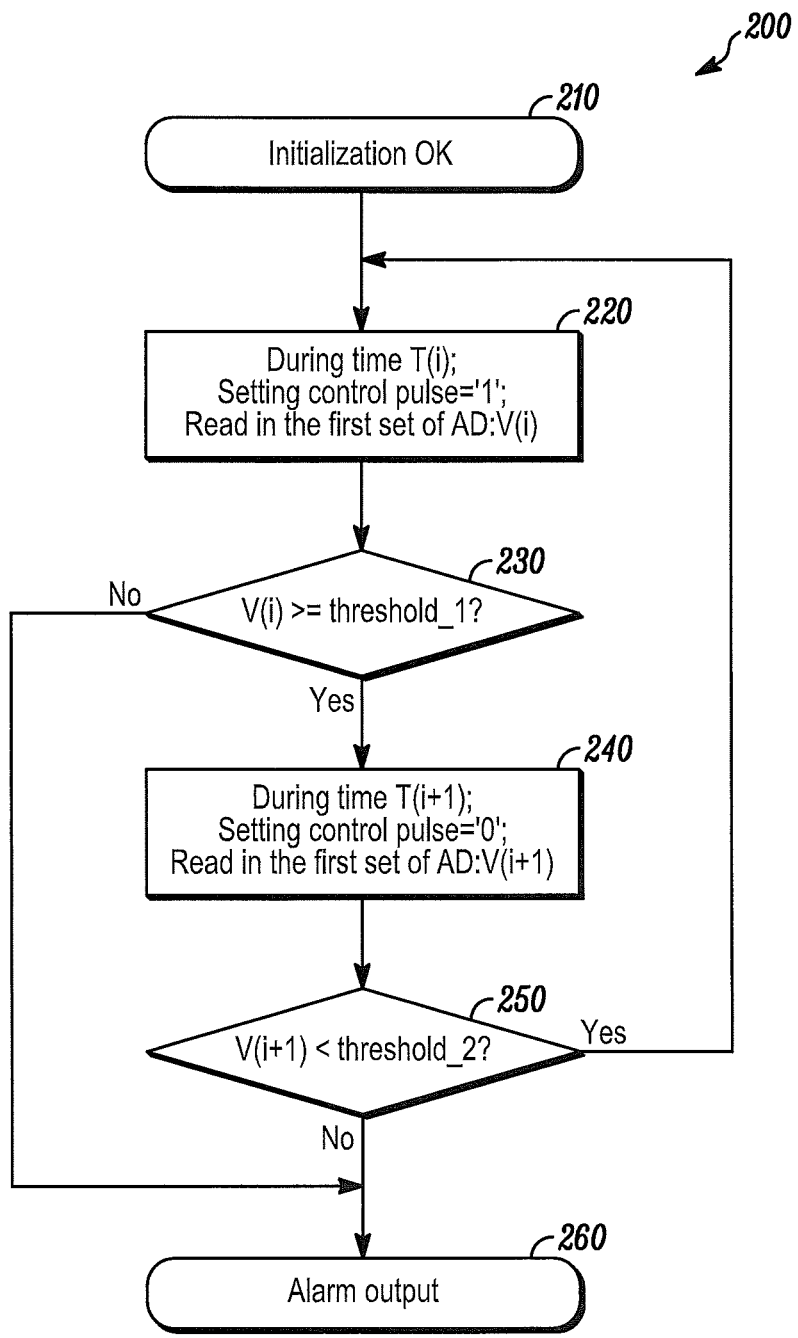
FIG. 2 is a flow diagram of an exemplary method of operating a detector as in FIG. 1.
Figure 3:
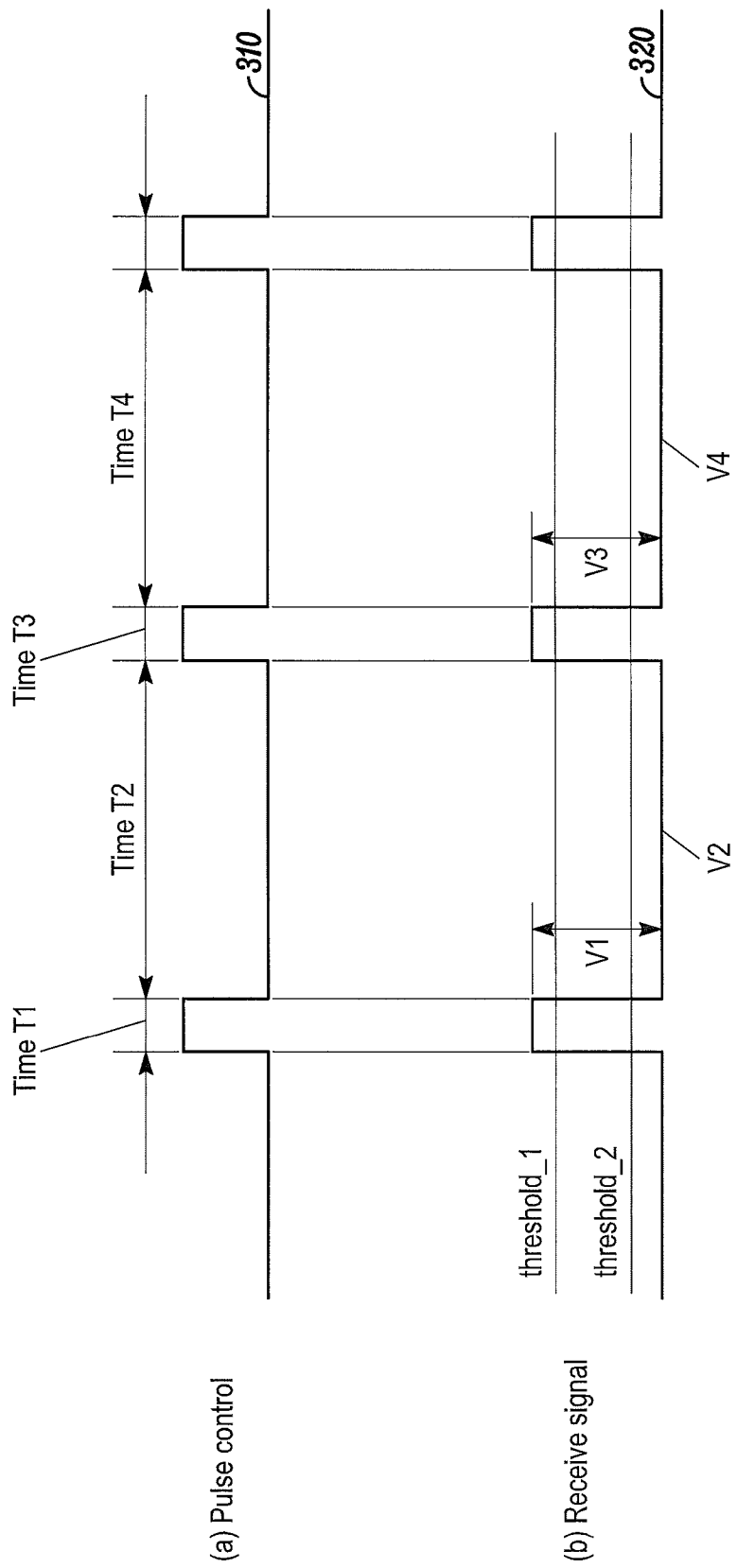
FIG. 3 illustrates a timing diagram of a transmitted and a received signal of an embodiment hereof.

FIG. 2 illustrates an exemplary method 200 of operating a detector as in FIG. 1. Process 200 is exemplary and is not a limitation hereof. Other processes come within the spirit and scope hereof. FIG. 3 illustrates a timing diagram of transmitted radiant energy pulses and received radiant energy pulses in accordance with the method of FIG. 2.

With respect to FIGS. 2, 3 the detector 10 is initialized, as at 210. As at 220, a pulse is emitted by source 20b and received at sensor 22a. If the received optical signal exceeds a predetermined threshold, such as threshold 1, as at 230, the next portion of the received pulse sequence is evaluated, as at 240. If the received value is below a predetermined threshold, such as threshold 2, as at 250 the process 200 is repeated since the respective door and frame, or window and frame are exhibiting the predetermined, closed state. Otherwise, an alarm can be output, as at 260.

Figure 4:
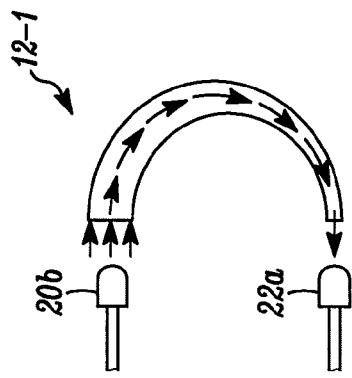
FIG. 4 illustrates a variation of the detector of FIG. 1.

FIG. 4 illustrates an alternate, variable diameter, tapered fiber optic member 12-1 usable with the detector of FIG. 1.

Figure 5:
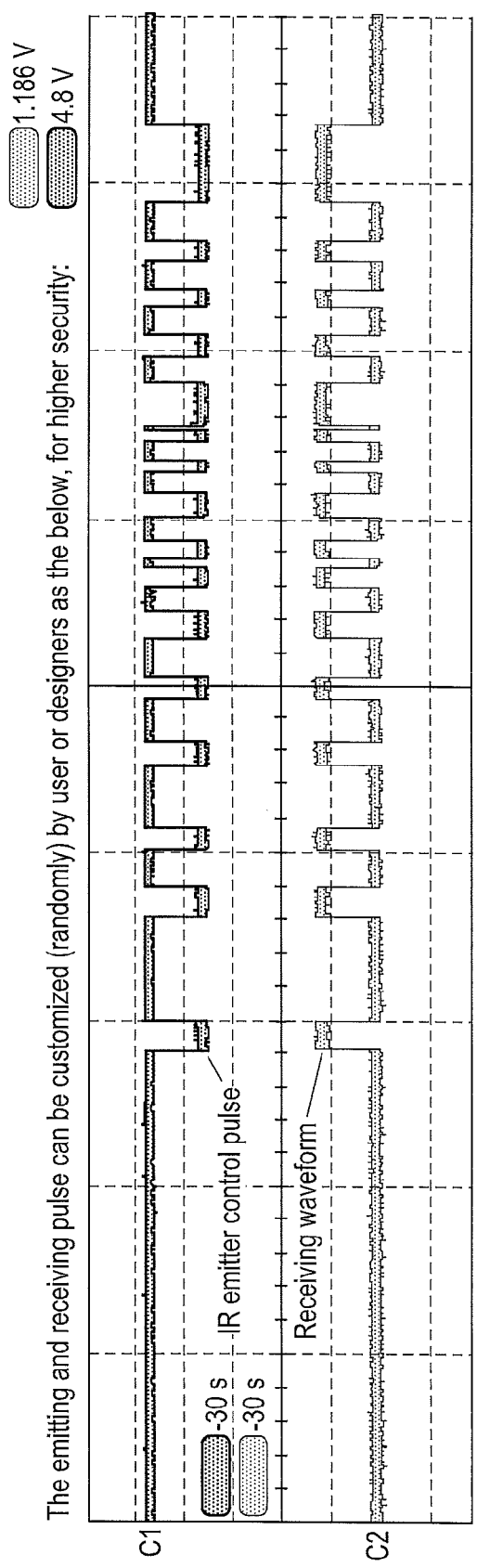
FIG. 5 is a timing diagram of a coded transmitted and received signal.

FIG. 5 illustrates an exemplary timing diagram of coded output control pulses, illustrated at C1, which can be produced by control circuits 18 and which generate coded radiant energy pulses at emitter 20b. The output pulses from emitter 20b are transmitted, via the fiber optic member 12 to the sensor 22a. Coded, radiant energy signals, illustrated at C2, received by sensor 22a can be converted to electrical waveforms and analyzed in the circuitry 18 of the detector 10 of FIG. 1.

It will be understood that the control circuits, and instructions 18-2 can present a time varying modulated sequence of optical signals, to be transmitted by conduit 12 and subsequently received at sensor 22a and analyzed by the control circuits 18. Such time varying modulated signal packets can be expected to provide enhanced security for the detector 10 as well as the other members of the plurality 10-i.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A position detector comprising:
an optical source;
an optical sensor;
control circuits coupled to the source and the sensor wherein the circuits energize the source with a predetermined pulsed, signal; and
a radiant energy conduit with first and second ends, one end is coupled to the source when the conduit is in a first position relative to the source, and the other is coupled to the sensor, and wherein if the one end moves from the first position, the coupling is disrupted; and
wherein the control circuits are configured to determine if an amplitude parameter of a selected, received pulse of the pulsed signal is greater than a predetermined threshold, and if so, those circuits determine if an amplitude parameter of a subsequently received pulse is less than a predetermined amplitude, and if not, an alarm is output.

2. A detector as in claim 1 where the conduit has one of a substantially constant diameter, or, a variable diameter.

3. A detector as in claim 1 wherein the control circuits include drive circuits, coupled to the source and where the drive circuits energize the source intermittently.

4. A detector as in claim 1 which includes a housing which carries the source, the sensor and the control circuits.

5. A detector as in claim 4 wherein the conduit is displaced from and outside of the housing.

6. A detector as in claim 5 wherein the control circuits modulate the source to generate a beam of radiant energy wherein modulation comprises at least one of pulse position modulation, pulse duration modulation, frequency modulation and phase modulation.

7. A detector as in claim 6 which includes interface circuits coupled to the control circuits that communicate via a medium with displaced supervisory circuitry.

8. A detector as in claim 7 wherein the interface circuits communicate wirelessly with the displaced supervisory circuitry and wherein the housing carries a battery coupled at least to the control circuits.

9. A detector as in claim 6 wherein the conduit comprises a fiber optic member.

10. A detector as in claim 1 wherein the predetermined signal is a coded signal.

11. A detector as in claim 10 wherein the control circuits modulate the source to generate a beam of radiant energy wherein modulation comprises at least one of pulse position modulation, pulse duration modulation, frequency modulation and phase modulation.

12. A detector as in claim 1 wherein the control circuits continue to evaluate amplitude parameters of selected received pulses.

13. A detector as in claim 1 wherein the pulsed signal, from the control circuits defines a predetermined, coded, sequence, and the waveform of received pulses can be analyzed by the control circuits.

14. A position detector comprising:
a source of radiant energy, such as infrared light, wherein a sensor is carried spaced apart from the source by a housing;
control circuits, carried by the housing, and coupled to the source and the sensor the control circuits drive the source to emit coded pulsed, radiant energy, wherein the radiant energy, emitted by the source is incident on the sensor only when transmitted by a solid optical medium which has a predetermined orientation relative to the housing, when the medium has the predetermined orientation, the sensor receives transmitted radiant energy from the source; when the medium moves from the predetermined orientation, the sensor ceases to receive the transmitted radiant energy from the source; and
wherein the control circuits are configured to determine if an amplitude parameter of a selected, received pulse of the pulsed signal is greater than a predetermined threshold, and if not an alarm is output, and, the control circuits determine if an amplitude parameter of a subsequently received pulse of the pulsed signal is greater than a predetermined threshold then an alarm is output.

15. A detector as in claim 14 wherein the control circuits determine if an amplitude parameter of a selected, received pulse of the pulsed signal is greater than a predetermined threshold, and if so, those circuits determine if an amplitude parameter of a subsequently received pulse is less than a predetermined amplitude, and if so, the control circuits continue to monitor the received pulses.

* * * * *